March 11, 1952  W. L. HOLE  2,588,981

PHOTOELECTRIC FLUID INSPECTION AND CONTROL DEVICE

Filed March 12, 1948  2 SHEETS—SHEET 1

William L. Hole
INVENTOR.

BY *Clarence A. O'Brien
and Harvey B. Jacobson*
Attorneys

March 11, 1952 W. L. HOLE 2,588,981
PHOTOELECTRIC FLUID INSPECTION AND CONTROL DEVICE
Filed March 12, 1948 2 SHEETS—SHEET 2
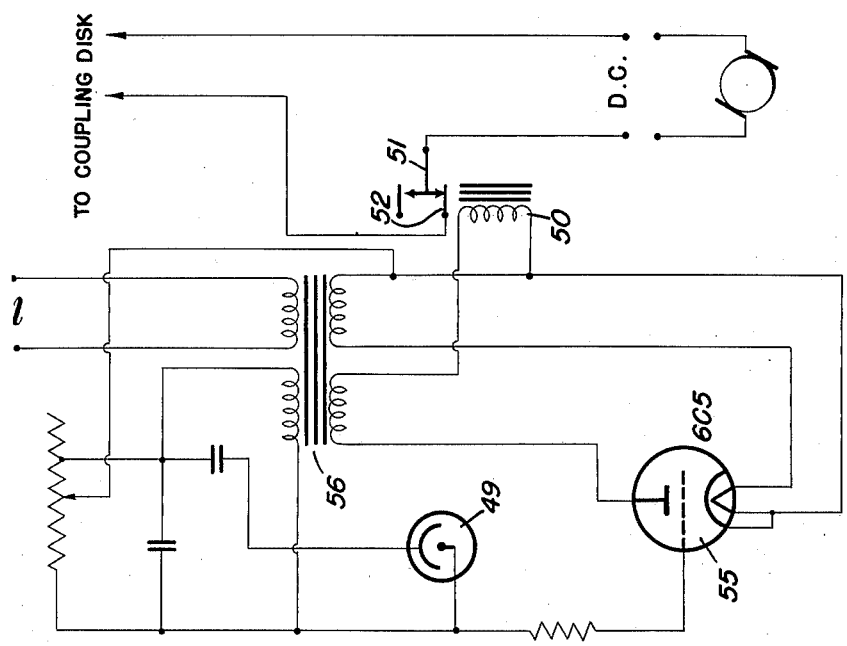
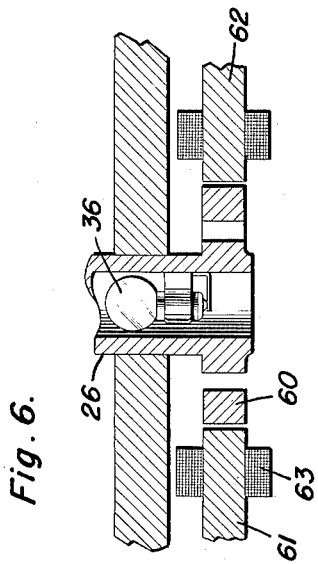
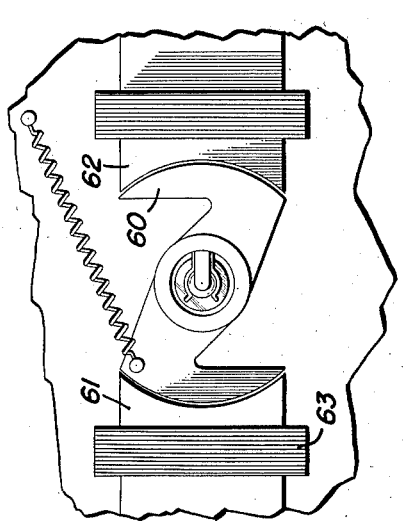
Inventor
William L. Hole
By Clarence A. O'Brien
and Harvey B. Jacobson
Attorneys Patented Mar. 11, 1952

2,588,981

UNITED STATES PATENT OFFICE 2,588,981

PHOTOELECTRIC FLUID INSPECTION AND CONTROL DEVICE

William L. Hole, Honolulu, Territory of Hawaii

Application March 12, 1948, Serial No. 14,566

5 Claims. (Cl. 137—78)

This invention relates to fluid inspection devices provided with photo-electric cells performing the inspection and it has for its main object to provide a simple and efficient device which scans or inspects a passing continuously flowing liquid and in the event of a change in its purity, color or the like, diverts it into a line leading to a special tank or receptacle for further purification or disposition.

While devices of the general type referred to are known and are especially used for the purpose of inspecting drinking water or a beverage to be filled into bottles they are as a rule operated in such a way that a sample stream is actually scanned and that the discharge is automatically stopped by means of a gate valve or other valve whenever the turbidity increases beyond a predetermined limit value. While such arrangements are very useful in certain cases, they cannot be used in other cases in which the liquid under inspection need not be stopped when a change of turbidity occurs, but where it is simply to be discharged or disposed of in a different way according to the prevailing degree of turbidity.

More specifically, the method of inspection in a sample stream is, as a rule, used not only for the purpose of shutting off the delivery or discharge of the fluid automatically upon detection of an excess of foreign matter, causing increased turbidity, but also for the purpose of continuing inspection while the main stream remains shut, thus allowing the operator to reopen the main stream when it is found that conditions have improved. However in the aforementioned case in which merely a discharge of the liquid into different lines or receptacles is required when the turbidity changes, the operator's activity becomes unnecessary and the equipment may be made automatic and currently and safely control the discharge.

It is therefore an object of the invention to provide an installation in which a continuous stream is permanently scanned and supervised by a photo-sensitive cell and is directed into the branch which corresponds to the grade of turbidity, color or the like existing for the time being.

It is a further object of the invention to provide a photo-sensitive scanning device which is located at a point passed by the stream of the fluid to be scannned within the member to be controlled which selects the proper line, duct or pipe leading to the different receptacles into which the stream is directed and which are to be selected in accordance with the condition in which the fluid is in and which expresses itself by a variation of turbidity, color or the like.

It is a further object of the invention to provide rotary means adapted to be angularly displaced for shifting the connection of the feed line to one of a plurality of receiving tanks or receptacles in accordance with the condition of the fluid, said means being provided with photosensitive inspection means operated by rays passing through the fluid stream in the axis of rotation of said rotary means thus conducting inspection at a point arranged as closely as possible to the discharge point but remaining stationary while the connections of the fluid with the receiving tanks are shifted.

Further, more specific objects will be apparent from the following detailed specification.

The invention will be better understood when described with reference to the accompanying drawings, showing one embodiment thereof. It is however to be understood that the said embodiment of the invention is shown by way of example only, in order to be able to explain the principle of the invention and the preferred mode in which it is contemplated applying said principle. Obviously further embodiments of the invention may be designed by experts skilled in this art, based on the present explanation of the invention foreshadowing some of them; modifications of the embodiment shown do therefore not necessarily form a departure from the invention.

In the drawing:

Figure 5 is a diagram of connections.

Figures 6 and 7 are a sectional side view and a plan view, respectively, of the sleeve connected with the cock member illustrating a modification of the means for rotating said sleeve.

Figure 1:
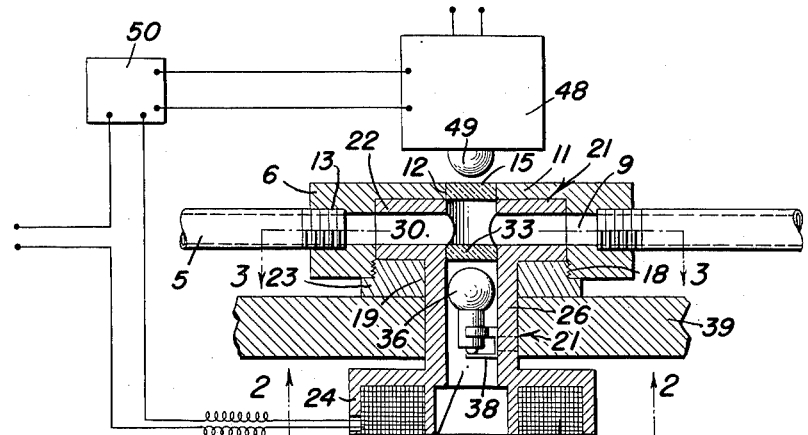
Figure 1 is an elevational sectional view of the device.
Figure 2:
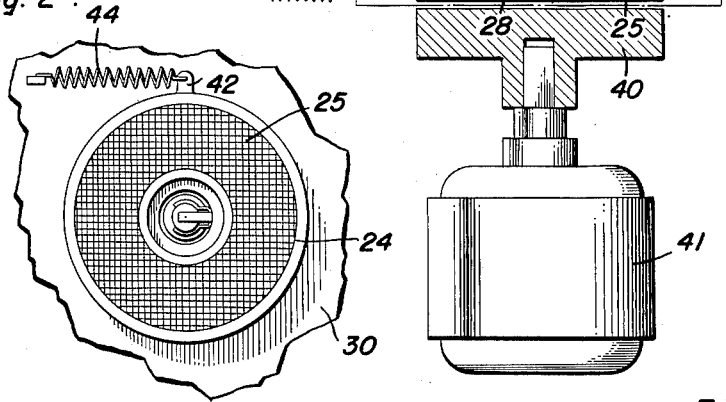
Figure 2 is a plan view seen from below taken from a plane passing through line 2—2 of Figure 1.
Figure 3:
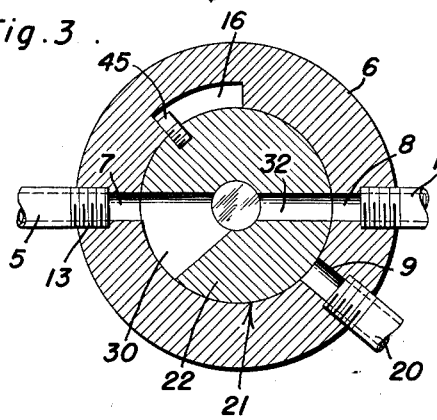
Figure 3 is a sectional plan view showing one position of the fluid directing member, the section being taken along line 3—3 of Figure 1.
Figure 4:
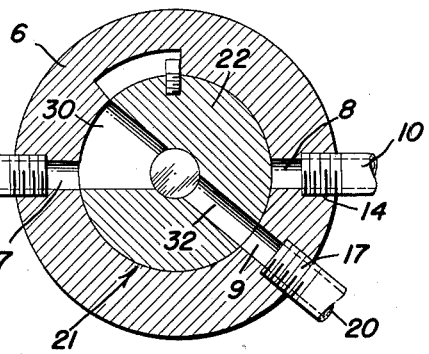
Figure 4 is a sectional plan view taken along the same line 3—3 of Figure 1 but showing another position of the fluid directing and classifying member.

As seen in Figures 1, 3 and 4 the fluid, juice, or effluent from some processing tank to be scanned is led to the apparatus by means of a feed or admission pipe line 5. The scanning and classifying apparatus comprises a stationary cylindrical housing 6 which may be cup-shaped as shown in Figure 1 and which is provided with a number of radially directed bores 7, 8, 9. These bores may be enlarged and threaded at the outside in order to connect the threaded end 13 of the fluid admission pipe line 5 with one of said bores, while the discharge pipes 10 and 20 are connected in the same way by means of screw threaded ends 14, 17 with the two other radial bores 8 and 9 respectively. In the bottom portion 11 of the cup shaped housing which is turned upwardly in Figure 1 and axial central bore 12 is provided which is closed and filled by a transparent disk or plug 15 of glass, plastic, quartz or the like. This axial bore 12 with the transparent disk or plug 15 forms therefore a window through which the scanning ray may pass as explained below.

The inner cylindrical wall of the housing is provided with a shallow slot 16 for a purpose to be described.

The open side of the cup shaped housing 6 is screw threaded (at 18) and a threaded closing disk 23 provided with a large central opening 19 may be inserted into said opening.

The interior of the stationary housing 6 encircles the rotatable fluid directing or distributing cock member, generally indicated at 21 which comprises the disk shaped fluid distributing and directing member 22 which is provided with a sleeve member 26 projecting outwardly through the central opening 19 of the closing disk 23 and through a base plate 39 on which the apparatus is supported and which also journals the rotatable cock member. On the outside this member carries a coupling disk 24 which may be provided with a winding 25 for a purpose described below.

The cock member 21 is provided with an axial central bore 28 piercing the disk 22, the sleeve member 26 and the coupling member 24. The fluid directing disk member 22 is moreover provided with a radial sector shaped cavity 30 forming a divergent channel radiating outwardly from the center of the disk 22. This channel is of an axial width which corresponds approximately to the diameter or axial height of bore 7. This channel intersects the central bore 28 and communicates with it. Moreover the said member is provided with a radial bore 32 running from the center outwardly and communicating with the central bore 28 which therefore joins the said sector and said bore.

The sector shaped channel extends over an angle of approximately 25°–45° or more, depending on the dimensions of the feed pipe 5. This channel faces the feed pipe and remains in communication with the same even if the cock member is rotated through an angle not exceeding the angular extension of the sector. The bore 32 may either register with bore 8 or with bore 9 of the housing when the cock member is moved angularly.

Below the point where the sector shaped channel 30 and the bore 32 join the central axial bore 28 the latter is again closed by a glass quartz or plastic disk 33 which is inserted in a fluid tight manner. Below said disk a small exciter lamp 36 is arranged and is held in the bore 28 by means of a suitable socket 38. This exciter lamp is permanently energized by means of conductors not shown which may have a sufficient excess length to permit a limited angular movement of the sleeve 26.

The coupling member 24 may be of any type and in the example shown is adapted to be coupled by means of its winding 25 with a ferro-magnetic fly wheel 40 driven by an electric motor 41 when the winding is energized. It is assumed that the motor 41 is provided for further driving purposes not connected with the device as described and by means of its fly wheel is used for producing a rapid angular movement of the coupling disk upon energization of the winding 25.

The coupling member 24 is provided with a lug 42 to which a spring 44 is attached. The latter returns the member 21 when it has been angularly moved.

In order to limit the angular movement and to provide fixed positions of rest the disk member 22 may carry a set screw 45 acting as a stop and moving within the shallow arcuate recess 16 of the housing.

Above the opening 12 the photo-electric cell arrangement 48 is located with the cell 49 itself arranged for operation by rays passing from the exciter lamp 36 through the bore 28 and the window 12. The cell arrangement contains the conventional amplifier 55 and high tension source of current which may be furnished, as customary in simplified arrangements, by a transformer 56 connected with a source A. C. The amplified photocell current operates a small relay switch 50 which is held in inoperative condition as long as the maximum current flows in the cell. The relay switch 50 controls at its springs 51, 52 the current flowing through the winding 25 of the coupling disk and closes the circuit when the cell current decreases or fails.

The operation of the device will be clear from the above description.

An effluent from some processing tank, a fluid, vegetable juice or the like to be scanned is fed to the device by means of pipe 5 and passes through bore 7 of housing 6 to the sector shaped channel 30. It then passes over and through the axial bore 28 filling the space between the window disks 15 and 33. In this space it is scanned by the rays of the exciter lamp 36 impinging upon cell 49. The fluid then passes on to bore 32 of cock member 22 and through bore 8 of the housing to discharge pipe 10 leading to a tank or receptacle receiving the fluid when conditions are normal and the turbidity is below a certain value for example. However if the turbidity or color changes or if foreign matter floating in the liquid prevents the photo-sensitive cell from receiving the predetermined light volume, the cell current drops, the relay switch 50 operates and the winding 25 is energized. This couples the member 24 with the ferro-magnetic flywheel, the member 21 starts to rotate and is moved clockwise in Figures 3 and 4 through an angle corresponding to the arcuate length of slot 16 which stops the set screw so that the cock member 21 is arrested in the position shown in Figure 4. The sector shaped channel 30 in this position is still in communication with bore 7, leading to the ray controlled space of bore 28 between the disks 15 and 33 but bore 9 now registers with discharge pipe 20 leading a tank or receptacle receiving the turbid or darkly colored liquid. It will be observed that this position is maintained until the turbidity diminishes or the lighter color of the liquid is restored. Then the cell gets again the full current, the winding is deenergized and the spring 44 restores the cock member to the position shown in Figure 3.

It will be noted that the device permits control of a fluid in bulk and that scanning is a continuous operation performed in the main stream of the fluid. The cock member is thereby automatically controlled and always occupies the position corresponding to the condition of the fluid.

When no motor is available, turning of the sleeve 26 may be obtained by placing a so-called Z-armature 60 on the sleeve which turns within poles 61, 62 provided with a stationary winding 63 energized by the relay switch 50.

It will be clear that changes of unessential details will not affect the invention.

Having described the invention, what is claimed as new is:

1. An apparatus for inspecting streaming fluids in bulk and for discharging said fluids selectively comprising a feed pipe for the fluid, a plurality of discharge pipes, a housing connected with said feed and discharge pipes, a cylindrical cock member arranged for limited angular rotary motion within said housing and provided with recesses for conducting the fluid from the feed pipe to a discharge pipe, said recesses being so shaped and arranged that in one position of the cock member the recesses form communication passages between the feed pipe and one of the discharge pipes, while in a different angular position of the cock member the said recesses form the communication passage between the feed pipe and another discharge pipe, said cock member being further provided with a central axial bore surrounding the axis of rotation of the said member and intersecting said fluid conducting recesses, means for producing an inspection light beam directed through said central bore, photo-sensitive means including a switch adapted to be closed and opened in accordance with the attenuation of the light beam passing through the central bore and electromagnetic means for producing an angular rotation of the cock member and for maintaining the same in the position to which it has been moved, thus changing the connection of its recess with the discharge pipe upon operation of said switch.

2. An apparatus for inspecting streaming fluids in bulk and for discharging said fluids selectively, comprising a feed pipe for the liquid, a plurality of discharge pipes, a housing connected with said feed and discharge pipes, a cylindrical cock member arranged for limited angular rotary motion within said housing provided with radial channels for conducting the fluid flowing towards and from its axis of rotation from the feed pipe to a discharge pipe, said channels being so shaped and arranged that in one position of the cock member the channels form communication passages between the said feed pipe and one of the discharge pipes, while in a different angular position the said channels form the communication passages between the feed pipe and another discharge pipe, said cock member being further provided with an axial bore along the axis of rotation, the latter intersecting said channels, transparent partition means on both sides of the said intersection, to secure a transverse flow through said axial bore, while preventing an axial flow of the fluid, a photo-sensitive device and an exciter lamp both arranged for operation in the axis of rotation of said cock member, a stop means on said rotary cock member, limiting its angular movement, a spring for bringing it into and maintaining it in one position, switch means operated by said photoelectric means, and electromagnetic means controlled by said switch means for turning the cock member angularly upon a change of conditions within the fluid affecting the light beam and for maintaining the same in the position to which it has been rotated, said angular rotation producing the change of connections between the fluid carrying feed pipe and different discharge pipes.

3. An automatic apparatus for inspecting streaming fluids in bulk and for discharging the same selectively in accordance with changes in their transparency, comprising a feed pipe, a plurality of discharge pipes, a closed cylindrical housing provided with channels communicating with said feed and discharge channels, a rotary cock member provided with a fluid distributing member, contained within said cylindrical housing, said member being provided with an axial bore surrounding its axis of rotation, a radial transversely directed recess running outwardly from said central bore through said rotary member and adapted to establish communication with the feed channel in a plurality of angular positions, a second radial recess, adapted to register with different discharge channels of the housing upon angular rotation of said cock member, said recesses intersecting said axial bore and communicating with the same, transparent disks on both sides of said intersection in said bore and said axial opening of the housing respectively enclosing a space within the said axial bore of the rotary cock member, establishing transverse communication between the recesses of the aforesaid member, a photo-sensitive device and an exciter lamp both arranged for operation in the axis of rotation of said cock member, a spring for bringing said cock member into and maintaining it in one angular position in which the feed channel is in communication with one discharge pipe, a stop means on said rotary cock member, limiting its angular movement and arresting the same in a position in which the feed channel is in communication with another discharge pipe in one position, switch means operated by said photoelectric means, and electromagnetic means controlled by said switch means for turning the cock member angularly upon a change of conditions within the fluid affecting the light beam and for maintaining the same in the position into which it has been rotated, said angular rotation producing a change of connections between the fluid carrying recess and the discharge pipes.

4. An automatic apparatus for inspecting streaming fluids in bulk and for discharging the same selectively in accordance with changes in their transparency, comprising a feed pipe, a plurality of discharge pipes, a closed cylindrical housing provided with channels communicating with said feed and discharge pipes, a rotary cock member provided with a fluid distributing member contained within said cylindrical housing, and a sleeve projecting outwardly through one of the axial openings of the housing, a coupling member carried by said sleeve, an axial channel, surrounding the axis of rotation provided within said sleeve and fluid distributing member, the latter being moreover provided with a sector shaped channel intersecting the axial bore and radiating therefrom and adapted to maintain communication with the feed channel of the housing during angular rotation of the cock member, and with a further radial channel intersecting said axial bore and moving from the same outwardly adapted to establish communication with different discharge channels of the housing upon angular rotation of the cock member, an exciter lamp arranged centrally within the axial bore and carried by the rotary cock member transparent closing disks in the axial bore and opening of the housing respectively, on both sides of the intersection of the said bore with the transverse channels, a spring for holding the rotary cock member in a definite position and for returning it when rotated out of this position, the feed channel being in communication with one of the discharge pipe channels in this position, a stop means on said rotary member for limiting its angular movement, and for arresting it in a position in which the feed pipe channel is in communication with another discharge pipe channel, a stationary photo-sensitive cell device, arranged with its cell in the axis of rotation of the rotary cock member, a relay switch controlled by said photo-sensitive cell device, a winding on said coupling member, an energizing circuit for the same controlled by the said relay switch, a continuously rotating coupling disk and a motor driving the same, said disk being adapted to be electromagnetically coupled with the sleeve projecting from the rotary cock member upon energization of the winding.

5. An apparatus for inspecting streaming fluids in bulk and for discharging said fluid selectively comprising a rotary member provided with an axially directed channel arranged in the axis of rotation and with radially directed channels leading to and from the said axially directed channel, means for sending a light beam along said axially directed channel, a photo-electric means aligned with said axially directed channel and controlled by said light beam, means for controlling the angular movement of said rotary member by said photo-electric means, said last-named means including an electromagnetic coil, means for energizing the same and a relay controlling the aforesaid means and controlled by a change of the current flow in the photo-electric means, a housing provided with a feed channel for the fluid, said feed channel being in communication with one of the radially directed channels of the rotary member in all angular positions of the same, a plurality of discharge channels in said housing, so arranged as to come alternatively into alignment with a transverse channel of said rotary member leading from the axially directed channel when said rotary member is in different angular positions, thus passing the fluid to be inspected from the feed channel through the channels of the rotary member selectively into one or the other of said discharge channels according to the angular position of the rotary member.

WILLIAM L. HOLE.

REFERENCES CITED

The following references are of record in the file of this patent:

UNITED STATES PATENTS

| Number | Name | Date |
|---|---|---|
| 1,455,795 | Logan | May 22, 1923 |
| 1,471,342 | Logan | Oct. 23, 1923 |
| 1,794,222 | Whitney | Feb. 24, 1931 |
| 2,076,964 | Pomeroy | Apr. 13, 1937 |
| 2,295,366 | Stout | Sept. 8, 1942 |